United States Patent [19]

Nimura et al.

[11] 4,386,245

[45] May 31, 1983

[54] NORMALLY-CLOSED SWITCHING MEANS WITH OVER-STROKE COMPENSATION

[75] Inventors: Koichi Nimura, Yao; Tadao Nakamura, Sakai, both of Japan

[73] Assignee: Hosiden Electronics Co., Ltd., Osaka, Japan

[21] Appl. No.: 272,678

[22] Filed: Jun. 11, 1981

[51] Int. Cl.³ ...................... H01H 13/70; H04M 1/23; H04M 1/50

[52] U.S. Cl. ................................ 200/5 R; 179/90 K; 200/5 A; 200/6 A; 340/365 R

[58] Field of Search .......... 200/5 R, 5 A, 6 A, 159 B, 200/159 A; 179/90 K

[56] References Cited

U.S. PATENT DOCUMENTS 4,291,201 9/1981 Johnson et al. ................ 200/6 A X

*Primary Examiner*—J. R. Scott

*Attorney, Agent, or Firm*—Steele, Gould & Fried

[57] ABSTRACT

A normally-closed switch in which a movable contact member is normally held in contact with a fixed contact member by spring-load of a plate spring member. When an operating member is pressingly operated, the plate spring member is resiliently displaced into a position where the plate spring member comes in contact with a stopper member. The movable contact member is thus separated from the fixed contact member. When the operating member is pressed further, the plate spring member is not displaced, but a resilient member is compressingly deformed, thereby compensating for the over-stroke of the operating member.

3 Claims, 6 Drawing Figures

NORMALLY-CLOSED SWITCHING MEANS WITH OVER-STROKE COMPENSATION

BACKGROUND OF THE INVENTION

The present invention relates to a normally-closed switch in which a movable contact member is normally held in contact with a fixed contact member by spring-load of a plate spring member. When an operating member is pressingly operated, the plate spring member is resiliently displaced into a position where the plate spring member comes in contact with a stopper member. The movable contact member is thus separated from the fixed contact member. When the operating member is pressed further, the plate spring member is not displaced, but a resilient member is compressingly deformed, thereby compensating for the over-stroke of the operating member.

There are several normally-closed switching means of this type employed in push-button dialing telephones.

In a push-button dialing telephone, the operating member of normally-closed switching means is pressed downwardly by a push-button or key top being depressed. The operating members moves the movable contact member, through the plate spring member, in the switch opening direction, thus causing the microphone circuit of the receiver to be shut off. Thereafter, a normally-opened switch is further operated, and closed, by the push of key tops to enable the circuit for detecting which numbers on the dial pad correspond to pushed key tops. The operating member of the normally-closed switching means is pushed further in this process than the distance corresponding to the distance to which key tops are pushed down to close the contacts of the normally-opened switch.

In the case of normally-closed switching means in which the operating member is over-travelled or over-stroked as described above, it is not enough for the operating member to travel only that distance necessary to separate the movable contact member from a fixed contact member. Rather, it is necessary for the operating member to over-travel a predetermined distance even after contacts of the normally-closed switch are opened.

Among the conventional normally-closed switching means, in which the operating member is arranged to make an over-stroke, are those in which the operating member and plate spring member are rigidly connected with each other in such a way that the plate spring member is resiliently deformed to such an extent as to correspond to the distance of the over-stroke of the operating member.

However, with such conventional means the plate spring member was unnecessarily deformed more than the amount of deformation otherwise necessary to separate the movable contact member from the fixed contact member. This arrangement has a serious drawback in that the plate spring member is so severely worn as to have an extremely short life, although it is intended to be used for a long time. In addition, the drawback is more prominent because the normally-closed switching means must be small in size considering the use thereof and the plate spring member employed in the normally-closed switching means must also be small in size. If a material having excellent anti-fatigue properties is employed to form the plate spring member, the drawback could be eliminated. However, such material is extremely high in cost and therefore neither proper nor practical for use as the material from which the plate spring member is made.

SUMMARY OF THE INVENTION

The object of the present invention is to provide a normally-closed switching means capable of reducing the amount of resilient deformation of the plate spring member to a necessary minimum extent, while at the same time allowing the operating member to make an over-stroke.

According to the normally-closed switching means of the present invention, an operating member and a plate spring member are interlocked with each other by a resilient member and the resilient displacement of the plate spring member caused by the operating member is stopped at a predetermined position by a stopper member. The plate spring member is resiliently displaced by a stroke necessary to separate the movable contact member from the fixed contact member, but only by a desired necessary minimum distance. Movement beyond this distance is prevented by the stopper member. The resilient displacement of the plate spring member is caused by the pressing force applied by the operating member to the plate spring member through the resilient member. However, the operating member can over-travel due to the resilient member even after the plate spring member is immobilized by the stopper member. When the pressing movement of the operating member is released, the plate spring member and the operating member are returned to their original positions by the resilient force of the plate spring member causing the movable contact member to contact the fixed contact member.

According to the normally-closed switching means of the present invention, the over-stroke of the operating member is not absorbed by the resilient deformation of plate spring member, which urges the movable contact member in the switch closing direction, but by the resilient deformation of a resilient member arranged separately from the plate spring member. It is therefore unnecessary for the plate spring member to be resiliently deformed more than is required to open the contacts, for the purpose of allowing the operating member to over-travel.

Since the necessary resilient deformation of the plate spring member is enough to be made minimum as described above, it is unnecessary that the plate spring member be made from an expensive material having excellent anti-fatigue properties. In addition, the fatigue of the plate spring member is made extremely small, substantially enhancing the life thereof. Further, it is possible for the movable contact member and the plate spring member to be integrally formed from a material having poor anti-fatigue properties but high conductivity, thus allowing electrical current flow to be enhanced.

Futhermore, in contrast to the plate spring member which is preferably made of a highly conductive material, the resilient member, for absorbing the over-stroke of operating member, can be made of a material selected from a large group of materials having larger resilient force than that of the plate spring member. Therefore, there is no fear that the resilient member will have a short life, due to fatigue, if made from inexpensive materials. A coil spring has a substantially longer life than that of a plate spring member.

The normally-closed switching means of the present invention is often employed in a push-button dialing telephone to shut off the microphone circuit of receiver. A plurality of pressure receiving pins are arranged on the operating member. The operating member acts as an operator, corresponding to each of all key tops (in the presently preferred embodiment), so that the shutting-off of the microphone circuit, which was conventionally achieved by separate switches corresponding to and responsive to the pushing-down operation of all of the key tops, can be accomplished by a single normally-closed switch. This arrangement prevents irregularity of switch operation, simplifies construction of the telephone and lowers the product cost, as compared with the case where a switch for shutting off the microphone circuit is arranged corresponding to each of the key tops.

The present invention will become apparent from the following detailed description, with reference to the accompanying drawings.

DETAILED DESCRIPTION OF THE PREFERRED EMBODIMENTS

Figure 1:
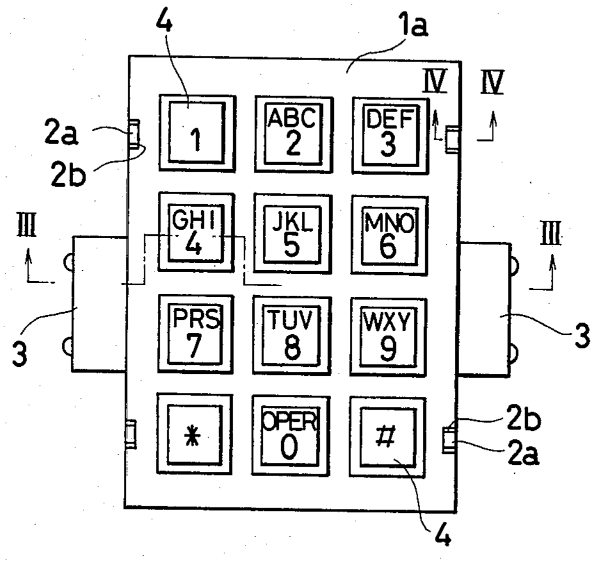
FIG. 1 is a plan view showing the keyboard module of a push-button dialing telephone.
Figure 2:
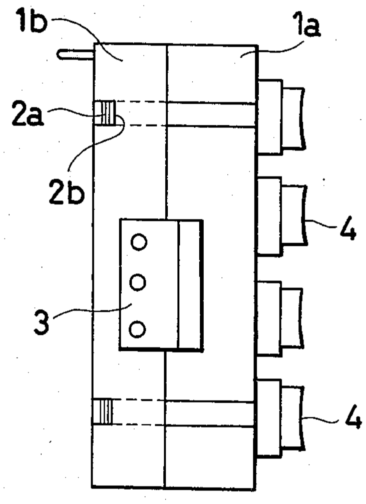
FIG. 2 is a side view of the keyboard module.
Figure 3:
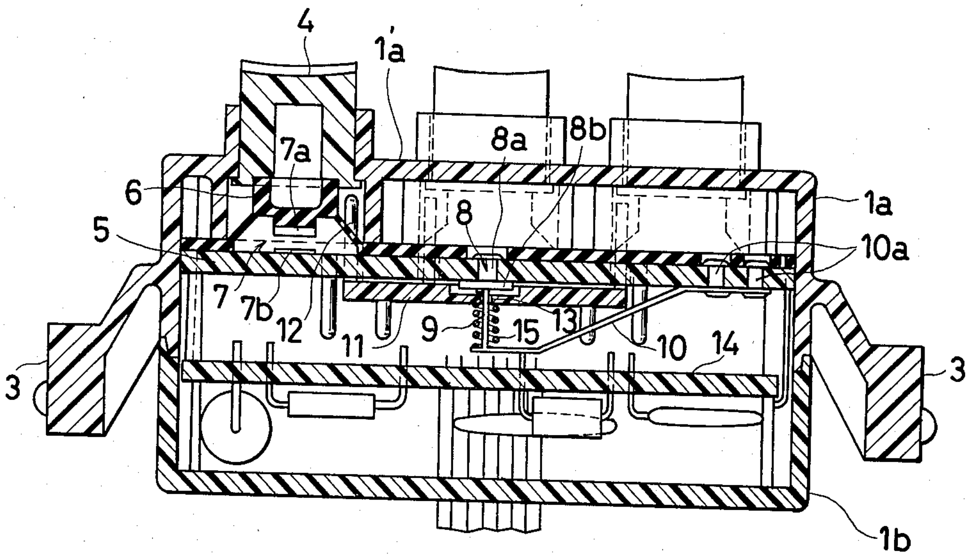
FIG. 3 is a cross sectional view taken along the line III—III in FIG. 1 and showing an embodiment of normally-closed switching means according to the present invention.
Figure 4:
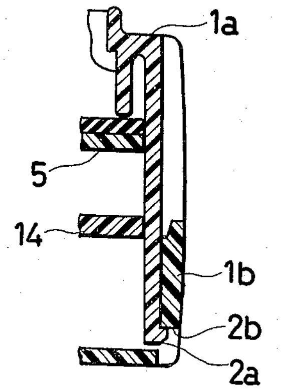
FIG. 4 is a cross sectional view taken along the line IV—IV in FIG. 1.

A keyboard module or unit incorporated into the push-button dialing telephone has an upper case half 1*a* and a lower case half 1*b*, which are connected with each other by means of engaging feet 2*a* and holes 2*b* formed on both sides of the upper and lower case halves, respectively. These case halves, as so connected, are fixed to the push-button dialing telephone by means of brackets 3 which project from both sides of upper case half 1*a*. Each of key tops 4, which are arranged as push-buttons in the upper case half 1*a*, is urged upwards by a rubber member 6 arranged on a fixed plate or printed circuit board 5 opposite and parallel to a roof 1'*a* of upper case half 1*a*. A normally-opened switch 7 for detecting pushed numbers and comprising a pair of upper and lower contacts 7*a* and 7*b* is arranged in the rubber member 6, said upper and lower contacts being closed by a predetermined pressing stroke.

Figure 5:
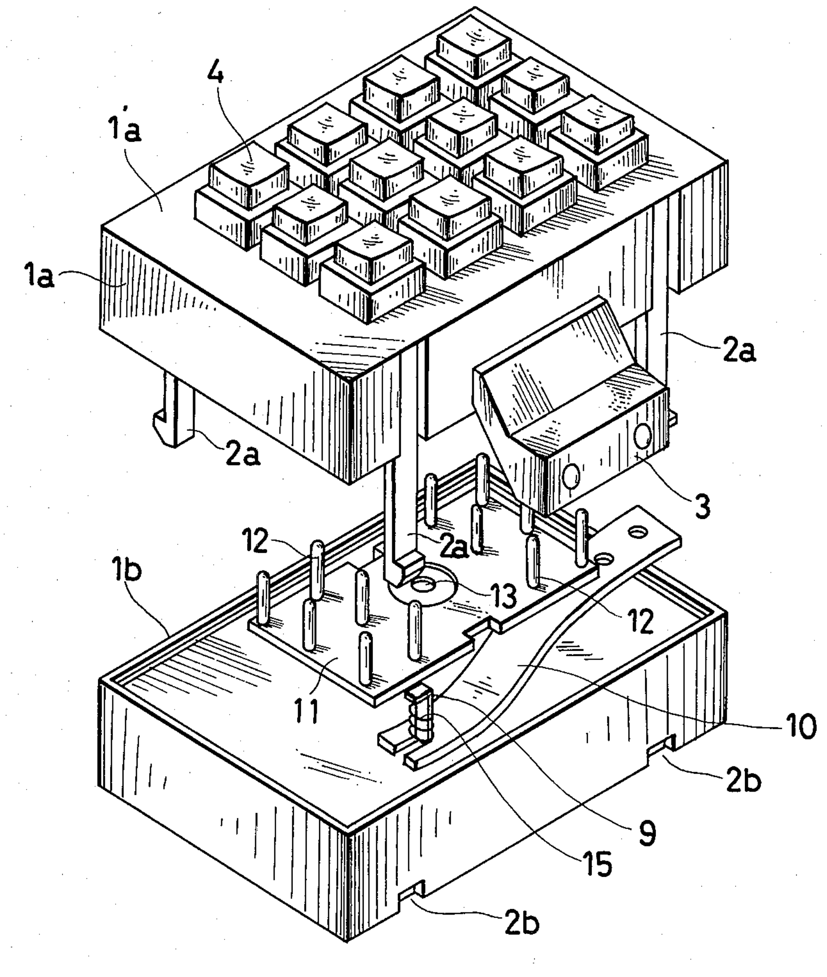
FIG. 5 is a perspective view showing the normally-closed switching means disassembled; and, FIG. 6 is a cross sectional view showing the arrangement of the normally-closed switch in more detail.

A normally-closed switch for shutting off the microphone circuit is arranged in the printed plate 5. Namely, a fixed contact member 8 comprising a rivet 8*a* and a contact 8*b* attached to one end of rivet 8*a* is arranged in the center of printed plate 5 in such a way that the contact 8*b* is positioned to the under side of printed plate 5. A movable contact member 9, which includes a vertical shaft, for example, is arranged facing the contact 8*b* of fixed contact member 8. Contact member 9 is urged into the normally-closed or elevated position by a plate spring 10 which serves as a plate spring member. The plate spring 10, curved like a bow, is fixed at one end thereof to the under side of printed plate 5 by means of rivets 10*a* and has the movable contact member 9 formed integrally at the other end thereof. The plate spring 10 urges the movable contact member 9 in the switch closing direction and can deflect downwards by a predetermined stroke. As shown in FIG. 5, the movable contact member 9 is formed by vertically bending one end of plate spring 10 upwardly. The upper portion of movable contact member 9 is further bent in L-shape to form a contact contactable with the contact 8*b*.

An operator or operating member 11 for closing and opening the microphone circuit is arranged between the printed plate 5 and the plate spring 10. The operating member 11, of plate shape, has an area covering all of key tops 4. A plurality of pressure receiving pins 12, which can contact with the lower surface of all key tops 4, project from the upper surface of operator 11. Therefore, the operating member 11 will be pressed downwards by the pushed-down movement of any one of the key tops 4. The operating member 11 has a throughhole 13 formed in the center thereof through which the movable contact member 9 is inserted. The operating member presses the upper surface of plate spring 10 downwards through a resilient member (which will be later described) to thereby move the movable contact member 9 in the switch opening direction.

Figure 6:
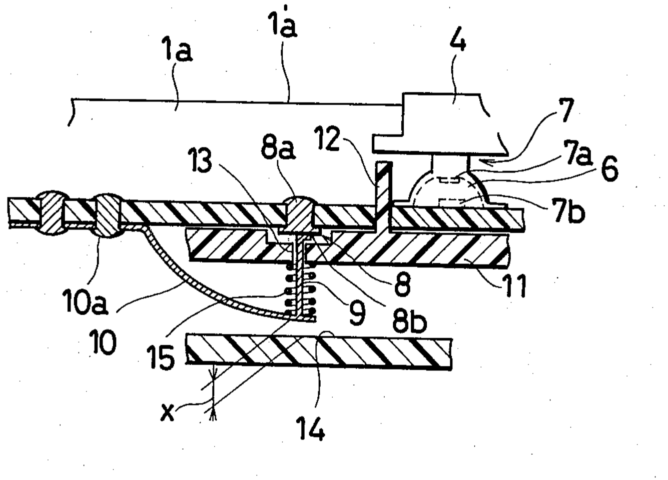

A stopper or stopper member 14 for stopping the plate spring 10 at a predetermined pressed-down position is arranged opposite and below the operating member 11 of plate spring 10. The stopper member 14 is a parts fitting plate, arranged on the upper side of lower case half 1*b* to define a predetermined space or distance X (FIG. 6) from the lower surface of the free end of plate spring 10 in the normally-closed condition. Therefore, the displacement of plate spring 10 in the switch opening direction is limited to the certain value or distance X, thus avoiding large unnecessary stress.

A compression coil spring 15 having a coefficient of restitution larger than that of plate spring 10 and serving as the resilient member is interposed between the plate spring 10 and operating member 11. The coil spring 15 transmits the pressing-down action of operating member 11 to the plate spring 10 and the spring-back force of plate spring 10 to the operating member 11 when the operating member 11 travels the predetermined stroke. When the operating member 11 exceeds the predetermined stroke, that is, after the plate spring 10 abuts against the stopper member 14, the coil spring 15 is compressedly deformed to absorb the over-stroke of the operating member in the direction in which the plate spring 10 is pressed down. Therefore, the stroke of operating member 11, caused by pushing down any of key tops 4 to close its pushed number detecting switch 7, can be made large enough due to the repulsive force of coil spring 15.

According to the normally-closed switching means having such an arrangement as described above, the displacement of plate spring 10 is limited by the stopper member 14, the pressing force of operating member 11 is transmitted via the spring member 15 to the plate spring 10, and the over-stroke of operating member 11 is absorbed by the spring member 15. Therefore, the stroke of operating member 11 can always be made large enough, against the predetermined repulsive force, and no excessive displacement of the plate spring 10 takes place. In contrast to the conventional means, the fatigue of plate spring 10 is reduced, providing a longer operating life.

Though a compressing coil spring is used as the resilient member 15 to absorb the over-stroke in the embodiment, it should be understood that any other properly resilient materials may be used as the resilient member.

Although the normally-closed switching means of the present invention is used in the disclosed embodiment to shut off the microphone circuit for push-buttons of a push-button dialing telephone, it should be understood that the means may be employed as other various switching means.

We claim:

1. A normally-closed switch, permitting an over-stroke operation, comprising:
   - a frame member;
   - a fixed contact member attached to said frame member;
   - a plate spring member mounted in a cantilever fashion at one end to said frame member and extending in such a way that the free end thereof faces toward said fixed contact member;
   - operating means including an operating member supported for movement, away from and toward said fixed contact member, by said frame member and adapted to resiliently displace said plate spring member in the direction away from said fixed contact member when said operating member is pressed;
   - a movable contact member disposed at the free end of said plate spring member and adapted to be held at a switch closing position where said movable contact member comes into contact with said fixed contact member by spring-load of said plate spring member when said operating member is not pressed, and adapted to be moved in the direction away from said fixed contact member against the spring-load of said plate spring member when said operating member is pressed;
   - a stopper member mounted on said frame member at a position spaced from said plate spring member, when said operating member is not pressed, by a predetermined distance in the direction along which said plate spring member is displaced by said operating member, said stopper member adapted to be contacted by said plate spring member when resiliently displaced through said predetermined distance, to prevent said plate spring member from being resiliently deformed beyond a predetermined amount; and
   - a resilient member disposed between said operating member and said plate spring member and adapted to hold them in a predetermined interlocking relationship when said plate spring member is not in contact with said stopper member, and adapted to be compressingly deformed to permit said operating member to perform an over-stroke operation in the direction toward said plate spring member when said operating member is further pressed after said plate spring member has come into contact with said stopper member.

2. A normally-closed switch permitting an over-stroke operation as recited in claim 1, wherein the operating means is constructed such that a plurality of pressibly operable push-buttons is supported by the frame member, and the operating member is provided with a plurality of pressure receiving pins corresponding to each of said push-buttons respectively, said operating member being moved toward said stopper member when any of said push-buttons are pressed.

3. A normally-closed switch permitting a over-stroke operation, as recited in claim 1, wherein the resilient member is a coil spring having a coefficient of resilience larger than that of the plate spring member.

* * * * *